(12) United States Patent
Zook

(10) Patent No.: US 8,137,541 B2
(45) Date of Patent: Mar. 20, 2012

(54) SEWAGE EFFLUENT DISTRIBUTION MEANS

(76) Inventor: Neal Zook, Bloomington, IN (US)

( * ) Notice: Subject to any disclaimer, the term of this patent is extended or adjusted under 35 U.S.C. 154(b) by 347 days.

(21) Appl. No.: 12/493,632

(22) Filed: Jun. 29, 2009

(65) Prior Publication Data

US 2010/0000917 A1    Jan. 7, 2010

Related U.S. Application Data

(60) Provisional application No. 61/077,217, filed on Jul. 1, 2008.

(51) Int. Cl.
*B01D 21/34* (2006.01)

(52) U.S. Cl. ... 210/116; 210/123; 210/128; 210/170.08; 137/397

(58) Field of Classification Search .............. 210/109, 210/116, 119, 123, 128, 170.08, 256, 532.2; 137/397, 398, 420, 423, 572; 405/40
See application file for complete search history.

(56) References Cited

U.S. PATENT DOCUMENTS

| | | | |
|---|---|---|---|
| 2,793,908 A | 5/1957 | Carver, Jr. | 299/27 |
| 3,451,554 A | 6/1969 | Wade | 210/278 |
| 3,497,067 A * | 2/1970 | Tyson | 210/259 |
| 3,956,137 A | 5/1976 | Dempsey | 210/532 |
| 4,092,995 A | 6/1978 | Stubenruss | 137/119 |
| 4,116,216 A | 9/1978 | Rosenberg | 137/624.13 |
| 4,313,455 A | 2/1982 | Pitman | 137/119 |
| 4,414,109 A | 11/1983 | Aurthur | 210/278 |
| 4,492,247 A | 1/1985 | Lockwood | 137/119 |
| 4,614,584 A | 9/1986 | Di Duca | 210/422 |
| 4,632,361 A | 12/1986 | Callison | 251/230 |
| 4,790,512 A | 12/1988 | Lindsay | 251/129.2 |
| 5,022,426 A | 6/1991 | Fischer | 137/119 |
| 5,118,418 A | 6/1992 | Roussel | 210/278 |
| 5,290,434 A | 3/1994 | Richard | 210/109 |
| 5,597,264 A | 1/1997 | Laak | 405/36 |
| 5,647,986 A | 7/1997 | Nawathe et al. | 210/608 |
| 5,988,945 A | 11/1999 | Bouvier | 405/54 |
| 6,050,286 A | 4/2000 | Kruer et al. | 137/119.03 |
| 6,059,967 A | 5/2000 | Field | 210/247 |
| 6,277,280 B1 | 8/2001 | Houck | 210/616 |
| 6,345,645 B1 | 2/2002 | Kenna et al. | 137/625.11 |
| 6,622,933 B1 | 9/2003 | Young et al. | 239/66 |
| 6,749,743 B1 | 6/2004 | Rohrer et al. | 210/97 |
| 6,886,588 B2 | 5/2005 | Malenfant et al. | 137/399 |
| 7,040,840 B2 | 5/2006 | Zook | 405/51 |
| 2005/0121078 A1 * | 6/2005 | Hebert et al. | 137/397 |

FOREIGN PATENT DOCUMENTS

JP    11014513 A    1/1999

* cited by examiner

*Primary Examiner* — Terry Cecil

(74) *Attorney, Agent, or Firm* — Brinks Hofer Gilson & Lione

(57) ABSTRACT

A septic system can include an improved and more reliable apparatus for distributing effluent uniformly to a plurality of portions or fingers of a drain field. In such apparatus, an effluent container, or collection tank, is connected with the outlet of a septic tank, and an effluent-operated valve controls effluent flow from an outlet of the effluent container, or collection tank, to an effluent distribution tank which is connected to a plurality of portions, or fingers, of a sewage drain field to uniformly distribute the effluent from the septic tank to the drain field.

10 Claims, 5 Drawing Sheets

SEWAGE EFFLUENT DISTRIBUTION MEANS

This patent application claims the benefit under 35 U.S.C. 119(e) of U.S. Provisional Patent Application Ser. No. 61/077,217 filed Jul. 1, 2008.

FIELD OF THE INVENTION

This invention relates to septic systems for the treatment of sewage, and more particularly relates to systems for the distribution of the effluent of a septic system to a drain field, including a plurality of fingers.

BACKGROUND OF THE INVENTION

Septic systems are extensively used to treat sewage from individual residences and businesses in areas not served by sewers. In the treatment of sewage by such septic systems, solid and liquid waste from the residence or business is collected in a septic tank in which, because of their different densities, the solid and liquid components of the sewage separate. The solid material is decomposed within the tank by the action of anaerobic bacteria, resulting in a liquid effluent. The liquid effluent is then conveyed out of the tank and distributed through an area of subterranean soil, which is frequently referred to as a drain field, and the liquid effluent then percolates through the soil and becomes purified before again joining the underground water table.

U.S. Pat. Nos. 7,040,840; 6,886,588; 6,749,743; 6,277,280; 5,647,986; 5,597,264; 5,290,434; 4,614,584 and 3,956,137; and Japanese Patent No. JP 411014513A relate to septic systems and various aspects of their operation.

In practice, sewage drain fields are generally divided into a number of portions, (frequently referred to as fingers, as in this application), and the effluent is distributed to the portions, or fingers, and over a wide area to avoid oversaturation of a portion of the drain field. In systems where the drain field is divided into a plurality of fingers, it is common to include in the system a distribution tank to receive the effluent from the septic tank and to distribute it to the plurality of fingers forming the drain field.

In the past, such effluent distributions have comprised a tank having an inlet connected with the effluent outflow of the septic tank and with a plurality of outlets distributed around the periphery of the bottom of the tank, which are connected by underground tubing or piping to the various fingers of the drain field. It is not uncommon, however, for the ground under such a distribution tank to settle, allowing the distribution tank to be tilted so that only one or a few of the fingers of the drain field receive all or a substantially greater part of the effluent outflow of the septic system. In addition, grease, mold, bacteria and other non-fluid waste can collect and grow in or on adjacent outlets of the distribution tank and restrict, and sometimes block, the flow of effluent from outlets of the distribution tank, creating a non uniform flow of effluent to the drain field. Under such conditions, the soil affected by the portion of the drain field receiving excess effluent can become saturated, requiring service of the septic system and possibly modification of the drain field. Because of the required excavation, re-installation of the distribution tank and the possible installation of new underground pipes, the servicing and modification of the sewage system can be expensive. The life of a septic system drain field can be substantially extended if the effluent from the septic system is uniformly distributed in the drain field.

U.S. Pat. No. 7,040,840 discloses means for distributing effluent more uniformly to a plurality of portions or fingers of a drain field.

BRIEF SUMMARY OF THE INVENTION

This invention provides, in a septic system, an improved and more reliable means for distributing effluent uniformly to a plurality of portions or fingers of a drain field. In the invention an effluent container, or collection tank, is connected with the outlet of a septic tank, and an effluent-operated valve controls effluent flow from an outlet of the effluent container, or collection tank, to an effluent distribution tank which is connected to a plurality of portions, or fingers, of a sewage drain field to uniformly distribute the effluent from the septic tank to the drain field. Apparatus of the invention for uniformly distributing sewage effluent to a drain field in a septic system can comprise two connected tanks, a first effluent container, or collection tank having an effluent inlet for collecting and containing the effluent to be distributed and an effluent-operated valve for controlling the flow of the collected effluent from an outlet of the first tank into a second distribution tank having a plurality of outlets for allowing effluent to flow from its interior to a plurality of portions or fingers of a drain field.

In one preferred such apparatus, a first effluent container, or collection tank can be carried within a second distribution tank, and an effluent operated valve can be carried within the first tank to control the flow of effluent contained in the first tank from an outlet formed in the first tank. In such a preferred apparatus the outlet of the first effluent container, or collection tank, comprises, preferably, an opening at its bottom, and a valve closure for the outlet is connected with at least one buoyant element operated by the level of the effluent in the first container, or collection tank, to open and close the outlet. Such a valve closure has generally an outlet sealing portion to engage a peripheral sealing portion around the outlet of the first container, or collector tank and close the outlet. In a preferred embodiment in which the second distribution tank carries and surrounds the first container, or collection tank, the at least one buoyant element is actuated by effluent which accumulates in the first container, or collection tank and lifts the at least one buoyant element which moves the outlet sealing portion of the valve closure from a valve closing position at the outlet of the first container, or collection tank, to permit accumulated effluent in the first container, or collection tank, to flow from its outlet into the second surrounding distribution tank that divides the effluent into a plurality of flows through a plurality of outlets of the second surrounding distribution tank which are connected with a plurality of portions or fingers of the drain field. Furthermore, preferred embodiments of the invention can provide a surge of flowing effluent that can clear, and carry, collected grease, mold, bacteria and non-fluid waste from the outlets of the distribution tank.

The invention further comprises, in septic systems including an effluent-operated valve to control the flow of effluent in the system, the improvement comprising providing the effluent-operated valve with a magnet and a magnetic attraction element to assist in seating the valve outlet sealing portion and in closing the valve.

The invention also comprises an effluent-operated valve assembly for controlling the flow of effluent in a septic system. In preferred apparatus for controlling the flow of sewage effluent, an effluent operated valve can comprise an assembly including a valve outlet-forming and valve closure guiding element, and an effluent operated valve closure assembly. The valve outlet-forming and valve closure guiding element can be adapted to be fastened within an opening formed in the bottom of an effluent collection tank and to support and guide the effluent-operated valve closure assembly within the effluent collection tank. The valve outlet-forming and valve closure guiding element preferably forms a valve outlet opening and a peripheral sealable surface around the valve outlet opening at the bottom of the effluent collection tank, and the effluent-operated valve closure assembly, which includes at least one buoyant member, preferably has a peripheral seal-forming surface at its bottom adapted to engage the peripheral sealable surface of the valve outlet-forming and valve closure guiding element and to close the valve outlet. The effluent-operated valve closure assembly is carried by, slidably engages, and is guided in its movement by the valve outlet-forming and valve closure guiding element so that the at least one buoyant member of the valve closure assembly can move upwardly in reaction to effluent accumulating in the effluent collection tank to raise the peripheral seal-forming surface at its bottom and open the outlet formed by the valve outlet-forming and valve closure-guiding element, allowing effluent to flow from the effluent collection tank In an effluent distribution apparatus of the invention, such an effluent-operated valve can control and provide a rapid flow of effluent from a first effluent collection tank into a second distribution tank and simultaneously from the plurality of outlets formed in the second distribution tank to the plurality of portions or fingers in the drain field.

As the collected effluent leaves the effluent collection tank, the at least one buoyant member of the valve closure element reacts to the falling level of the effluent in the first container, or collection tank, and lowers the peripheral seal-forming surface at its bottom into sealing engagement with the valve outlet-forming and valve closure guiding element, permitting the accumulation of effluent in the effluent collection tank.

In preferred embodiments of effluent-operated valves of the invention, the buoyant member can be divided into an upper buoyant member and a lower buoyant member so the seal-forming surface of the valve closure assembly is supported above the cooperating seal-forming surface of the valve outlet for a longer period to allow more complete exhaustion of the effluent accumulated in the first collection tank.

In preferred embodiments of effluent-operated valves of the invention, magnetic attraction can be provided to assist in more positive seating of the seal-forming surface of the valve closure on the cooperating seal-forming surface of the valve outlet and prevent effluent seepage in the valve closure. For example, in a preferred embodiment of an effluent operated valve, the valve outlet-forming and valve closure guiding element carries a magnet, and the effluent-operated valve closure assembly carries an element that is attracted by the magnet as a peripheral seal-forming surface of the effluent-operated valve closure assembly approaches the peripheral sealable surface of the valve outlet-forming and valve closure guiding element.

The invention can thus provide a septic system apparatus by which effluent is more uniformly distributed among the fingers of a septic drain system, thus avoiding and deferring expensive servicing of the septic system, and provides means for uniformly distributing effluent into a drain field that can be easily added to existing septic systems to avoid and defer such expensive servicing.

Further features and advantages of this invention will be apparent from the following, more detailed description, and the accompanying drawings.

BRIEF DESCRIPTION OF THE DRAWINGS

FIG. 3A is a perspective view of a spacing support of the apparatus;

DETAILED DESCRIPTION OF THE PREFERRED EMBODIMENTS OF THE INVENTION

Figure 1:
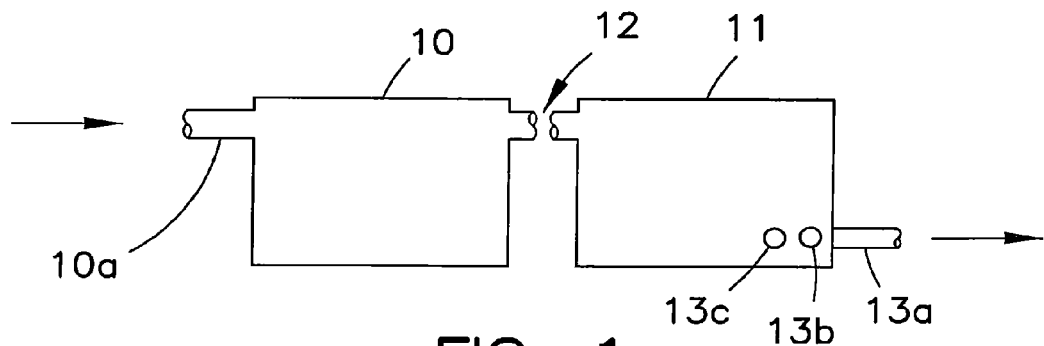
FIG. 1 is a simple diagram of a typical unimproved septic system.

FIG. 1 is a diagram of a typical unimproved septic system. Such a system includes a septic tank 10 into which raw sewage is directed through an inlet 10a for treatment. In the septic tank 10, solid material and liquid material become segregated by virtue of their different densities, and the solid material is decomposed by the action of an anaerobic bacteria. The resulting liquid sewage effluent flows from tank 10 to a distribution tank 11 through interconnecting piping 12. The distribution tank 11 includes a plurality of outlets 13a, 13b, 13c . . . 13x, each of which is connected to a different portion or finger of the drain field. In such systems, the liquid effluent flows from the distribution tank 11 into the plurality of outlets 13a, 13b, 13c . . . 13x, under the influence of gravity. If, however, the position of the distribution tank 11 shifts under the earth so that one or a few of the plurality of outlets, for example, outlet 13a shown in FIG. 1, is lower than the others of the plurality of outlets, a disproportionate flow of effluent to one portion of the drain field will occur, increasing the possibility of over-saturation of that portion of the drain field. If the distribution box 11 becomes sufficiently tilted, with a slow influx of effluent to the distribution tank, some of the plurality of outlets may receive no effluent at all.

U.S. Pat. No. 7,040,840 shows a system to overcome this problem, among others, by an effluent-operated valve, which may be installed in an existing distribution tank to distribute effluent more uniformly to the distribution tank outlets and the portions or fingers of the drain field.

FIGS. 2-6 illustrate preferred apparatus of this invention for more uniformly distributing sewage effluent to a drain field, including a preferred and improved effluent-operated valve.

Figure 2:
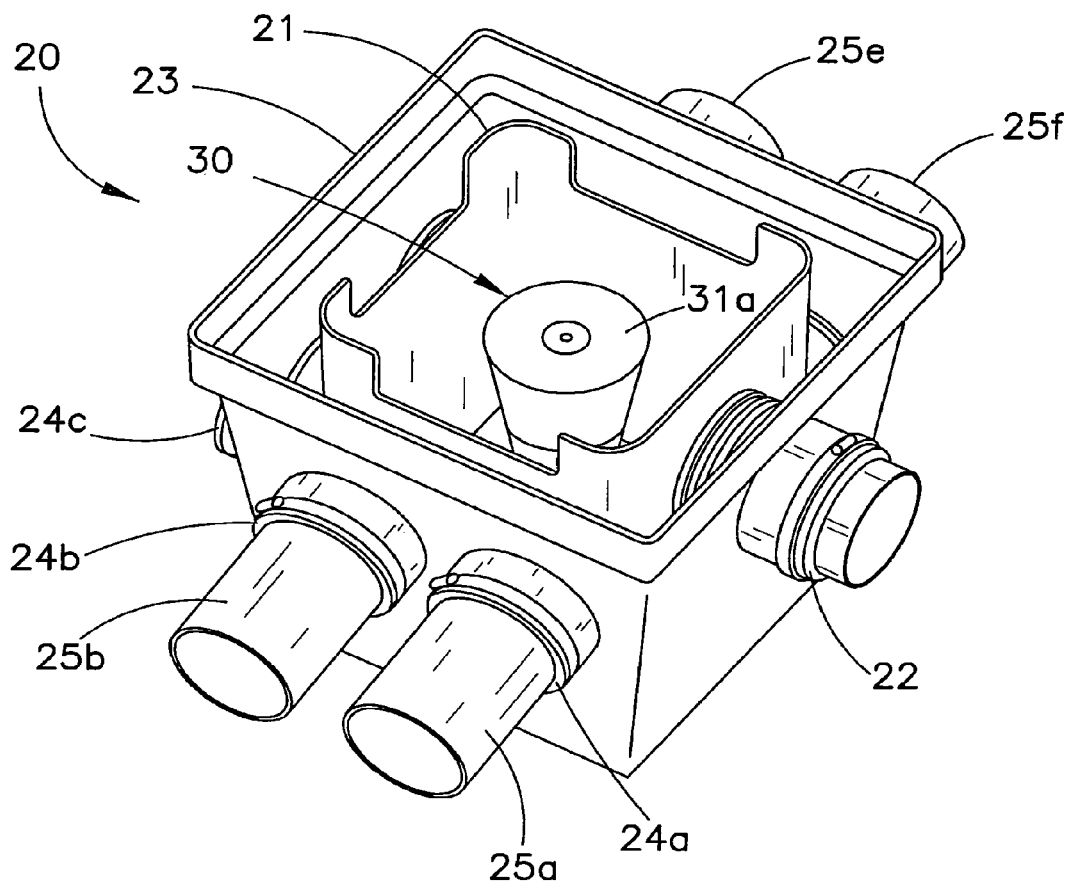
FIG. 2 is a perspective view of a preferred apparatus of the invention for uniformly distributing sewage effluent to a drain field in a septic system, with its cover removed to display its interior.
Figure 3:
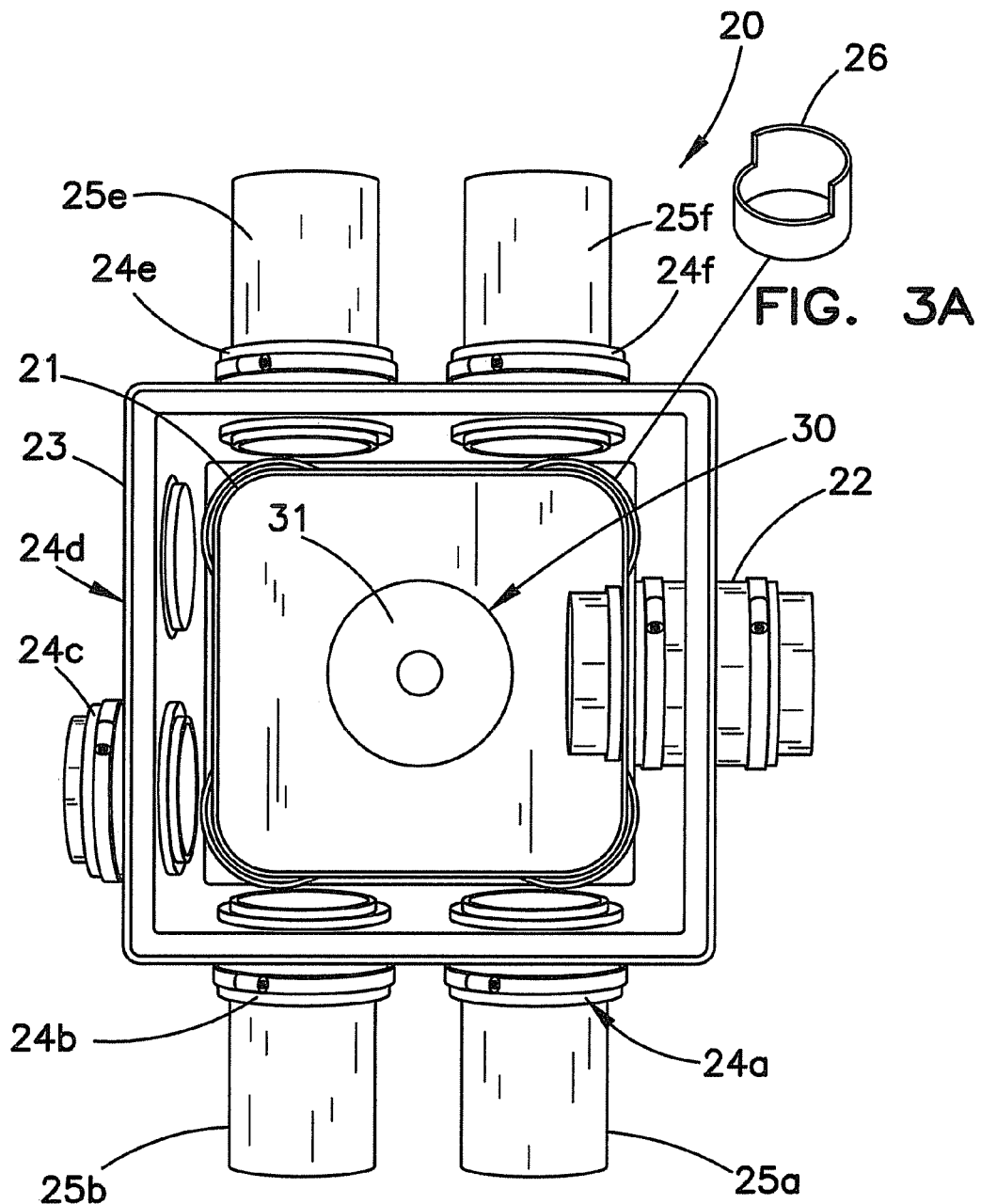
FIG. 3 is a top view of the preferred apparatus of FIG. 2 for uniformly distributing sewage effluent to a drain field in a septic system, with its cover removed to display its interior.

As illustrated in FIGS. 2 and 3, such an improved apparatus 20 includes an effluent container 21, in the form of a first collection tank, provided with effluent inlet 22 for connection with the outlet of a septic tank, and an effluent distributor 23, in the form of a second distribution tank, including a plurality of effluent outlets, for example, 24a, 24b, 24c, and 24d, 24e, 24f (not shown in FIG. 2), which may be sealingly engaged with a plurality of lines, for example, 25a, 25b, 25e, 25f, that lead to different portions or fingers of the sewage drain field. (In FIGS. 2 and 3 no connecting lines 25c, 25d are shown engaged with effluent outlet 24c and effluent outlet 24d, which, as shown in FIG. 3, may be sealed if not in use.) In the preferred apparatus illustrated in FIGS. 2 and 3, the first container, or collection tank, 21 is carried within the second distribution tank 23 by a plurality of spacing supports 26, best shown in FIGS. 3A and 6, and an outlet leading from the first container, or collection tank, 21 to the distribution tank 23 is formed at the bottom of the first container, or collection tank, 21, and an effluent-operated valve 30, best illustrated in FIGS. 4A, 4B and 5, controls the flow of effluent accumulating within the first container, or collection tank, 21 from the first container, or collection tank, 21 into a second distribution tank 23 as described more fully below. In the illustrated preferred embodiment the first container, or collection tank, 21 the second distribution tank 23 and the effluent-operated valve 30 are substantially coaxially arranged.

The apparatus 20, illustrated in FIGS. 2 and 3, operates as follows. Effluent from the septic tank of a sewage system flows into the effluent inlet 22 and accumulates within the first container, or collection tank, 21. As the level of the effluent within the first container, or collection tank, 21 rises, it will begin to act upon the buoyant member 31 at the top of the effluent operated valve 30 (FIGS. 4A, 4B and 5), and will eventually overcome the weight of the effluent-operated valve assembly 30 and the hydrostatic pressure providing downward force on the effluent-operated valve assembly 30, and any magnetic attraction force (described below) incorporated in the valve, lifting the effluent-operated valve assembly 30 and opening a valve closure portion 33 at the bottom of the effluent-operated valve 30, permitting the effluent accumulated within the first container, or collection tank, 21 to flow from the first container, or collection tank, 21 into the distribution tank 23 and outwardly from the peripherally located effluent outlets 24a-24e of the distribution tank 23, which have been connected (e.g., 25a, 25b, 25e, 25f) to the different portions, or fingers, of the drain field.

Figures 4A, 4B:
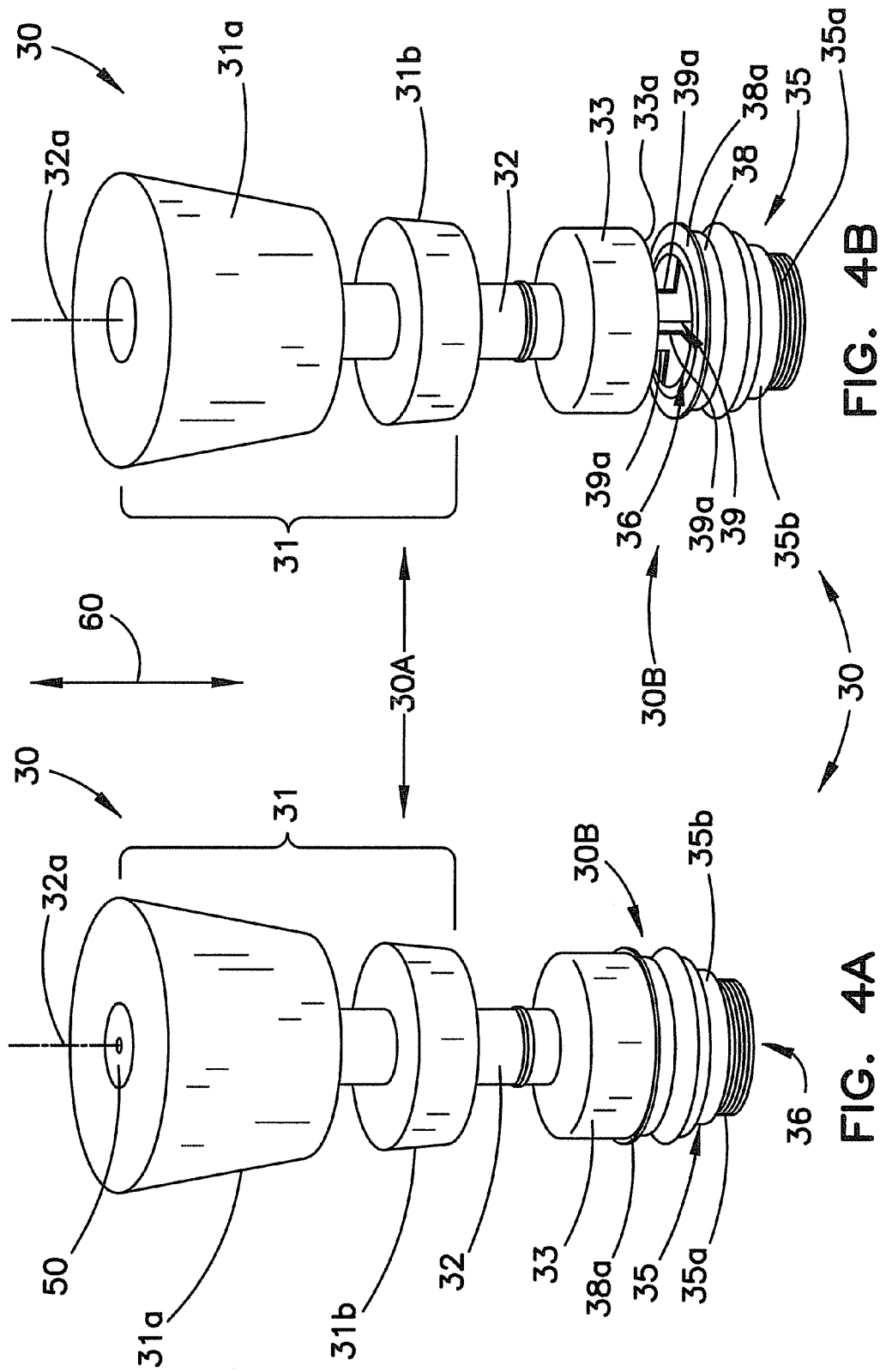
FIG. 4A and FIG. 4B are perspective views of a preferred effluent-operated valve of the invention, FIG. 4A illustrating the preferred effluent operated valve in the closed position, and FIG. 4B illustrating the preferred effluent operated valve of the invention in the open position.
Figure 5:
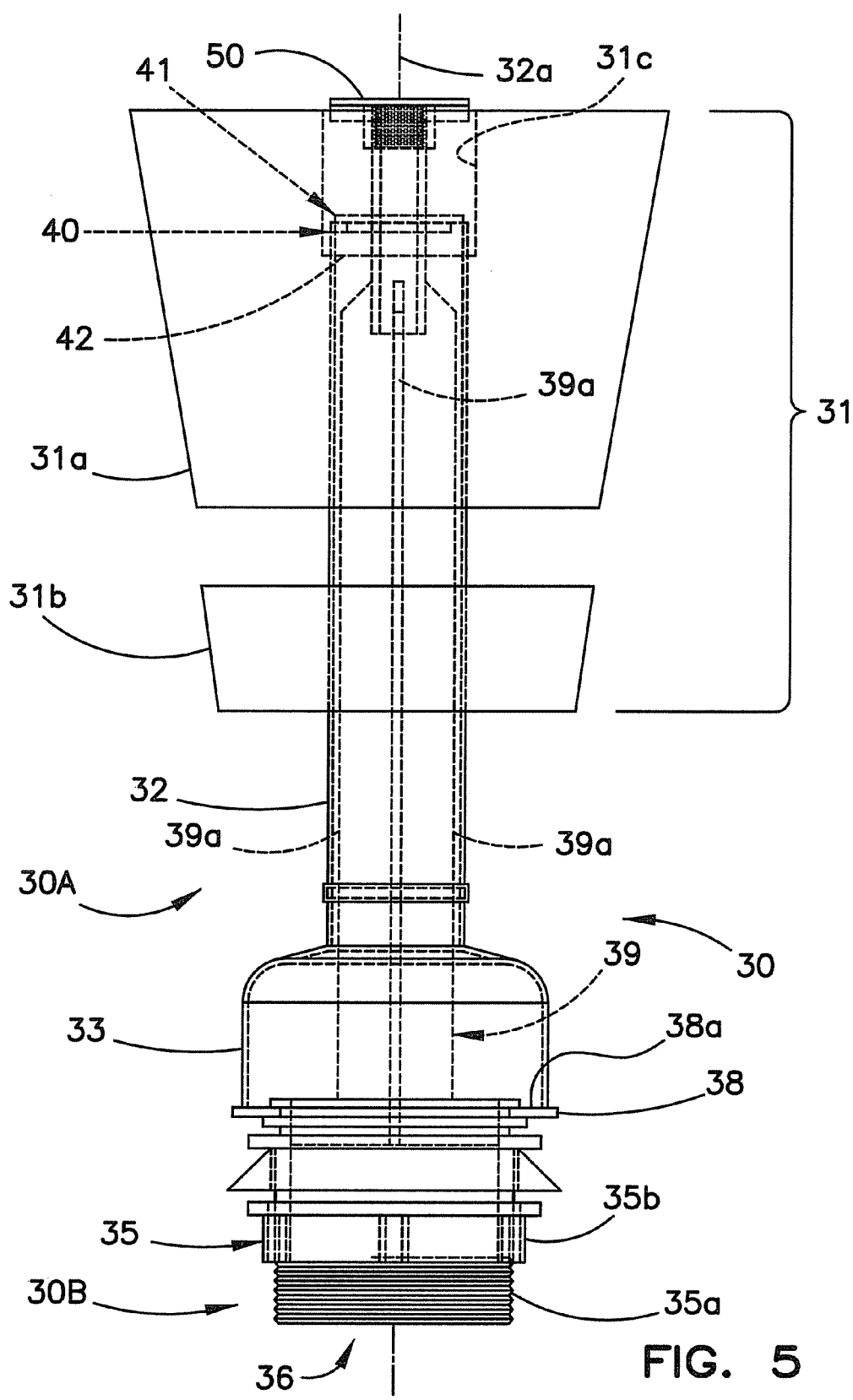
FIG. 5 is drawing side view of the preferred effluent-operated valve of FIGS. 4A and 4B in the valve closed position, with the interior structure and valve closure guiding portion of the valve opening-forming and valve closure guiding element illustrated in dashed lines.

A preferred effluent-operated valve 30 of the invention is shown in FIGS. 4A, 4B and 5. As illustrated in FIGS. 2 and 3, such a preferred effluent-operated valve 30 may be located in the first container, or collection tank, 21 to control the flow of effluent collected in the first container, or collection tank, 21 into the distribution tank 23. As illustrated in FIGS. 4A, 4B and 5, the preferred effluent-operated valve 30 comprises two interacting assemblies, a valve closure assembly 30A and a valve outlet-forming and valve closure guiding assembly 30B, which carries and guides the movement of the valve closure assembly 30A. The valve closure assembly 30A includes a buoyancy-creating element 31, preferably comprising two spaced buoyancy-creating elements 31a and 31b, as set forth more fully below. In the valve closure assembly 30A, the buoyancy-creating element or elements 31 are attached to an elongated tube 32, whose central axis 32a is the path of movement of the valve closure element 30A in its travel upwardly in response to an increasing accumulation of effluent in the first container, or collection tank, 21 and downwardly in reaction to a decreasing accumulation of effluent in the first container, or collection tank, 21. Valve 30 is shown in the closed position 30 in FIG. 4A and in the open position in FIG. 4B. The lower end of the valve closure assembly 30A terminates in a downwardly-open, cup-shaped element 33, with its bottom edge forming a peripheral seal-forming surface 33a.

The second interacting assembly portion 30B of the preferred effluent-operated valve 30 comprises an assembly including a valve outlet-forming portion 35 forming a central valve outlet 36 with the surrounding flange 38 forming a peripheral sealing surface 38a. As illustrated in FIGS. 4B and 5, carried within the outlet-forming element 35 is a valve closure guide 39. The valve closure guide 39 may comprise, as illustrated in FIGS. 4B and 5, an elongated member having a cross-shaped cross-section so that when it is assembled in the valve outlet-forming and valve closure guiding assembly 30B, it does not block the outlet 36 formed thereby. As best illustrated in FIG. 5, the cross-shaped valve closure guiding portion 39 extends upwardly from the valve outlet-forming portion 35 and valve outlet 36 and is inserted into the central passageway of the elongated tubular element 32 of the valve closure assembly 30A so that its four outer edge surfaces 39a guide the valve closure assembly 30A as it travels upwardly and downwardly in response to the accumulation and evacuation of effluent from the first container, or collection tank, 21. While the figures illustrate a valve closure guidance element 39 with a cross-shape cross-section providing four guidance surfaces 39a, the valve closure guidance element 39 may have other shapes, but preferably forms at least three-outwardly extending guidance surfaces with small outer surface areas to avoid friction between the tubular element 32 of the valve closure assembly 30A and the guidance surfaces 39a of the valve closure guidance element 39.

The valve outlet-forming portion 35 includes at its lower end a threaded outer surface 35a and a mating threaded nut element 35b which permit the effluent-operated valve 30 to be inserted into a round opening at the bottom of an effluent tank, such as the first container, or collection tank, 21, and to be supported therein in operating position by tightening the mating threaded member 35b to form a compression seal between the element 35 and the container, or collection tank, in which it is carried.

The buoyant member 31, or members 31a and 31b, may be any material having a density substantially less than the effluent, which has about the density of water. For example, the buoyant member 31 may be conveniently formed from polyethylene foam. While the buoyant member 31 is shown in the form of inverted cone, any shape may be used, provided it defines a sufficient volume to displace a sufficient volume of effluent to develop a lifting force sufficient to overcome the weight of the valve closure assembly 30A and the force developed by the pressure of the effluent acting downwardly on the upwardly facing surfaces of the valve closure assembly 30A, and in preferred effluent-operated valves, the force of magnetic attraction between the magnetic elements incorporated in the valve to assist its closing.

Referring to FIGS. 4A and 4B, when the level of effluent surrounding the effluent operated valve 30 is low (for example, after the effluent has been depleted from a first container, or collection tank, 21 in which the effluent-operated valve 30 may be carried), the weight of the valve closure assembly 30A urges the peripheral seal-forming surface 33a downwardly against the peripheral sealing surface 38a, closing the outlet 36 of the effluent-operated valve, as shown in FIG. 4A, so no effluent can enter the outlet 36. When a sufficient volume of effluent has accumulated around the effluent-operated valve 30, the buoyant element 31 develops an upward force as indicated by the arrow 60 in FIG. 4B, and when a sufficiently high level of effluent surrounds the effluent-operated valve 30, the buoyant member 31 develops an upward force, as indicated by the arrow 60 in FIG. 4B, which will overcome the weight of the valve closure assembly 30A and the downward force developed by the hydraulic pressure on the upper surfaces of the valve closure assembly 30A (and any magnetically generated forces present as described below) and lift the peripheral seal-forming surface 33a from the peripheral sealable surface 38a, opening the valve outlet 36, as illustrated in FIG. 4B, and allowing a surge of effluent to flow therethrough.

As explained above, when an effluent-operated valve 30 is used in an apparatus such as that illustrated in FIGS. 2 and 3, effluent accumulating in the first container and collection tank 21 creates a lifting force on the effluent-operated valve assembly 30 and overcomes the weight of the valve closure assembly 30A and the hydraulic forces acting downwardly on the upwardly facing valve portions of the valve closure assembly 30A, and any magnetically generated forces present, and opens the valve outlet 36, which results in a surge of effluent that flows through the valve outlet 36 and into the distribution tank 23 and from its plurality of outlets 24a . . . 24x to the fingers of the drain field that are connected thereto.

It has been found that there are times in operation of the effluent-operated valve 30 that the peripheral seal-forming portion 33a at the bottom of the valve-closure assembly 30A may not completely seat against the peripheral seal-forming surface 38a, resulting in undesirable seepage into the valve outlet 36. In a preferred effluent-operated valve 30 of the invention, this problem can be addressed by providing a force developed by magnetic means to assist in seating the peripheral seal-forming surface 33a on the peripheral sealing surface 38a and closing the outlet 36 of the valve. Thus, as shown in FIG. 5, in such a preferred effluent-operated valve of the invention, a ferrite magnet 40 is attached to the upper end of the valve closure guidance element 39 and a steel washer 41 is fastened within the upper portion of the buoyant member 31 in a location so that the magnetic attraction between the ferrite magnet 40 and the steel washer 41 provides an increased downward force on the valve closure assembly 30A to assist in more positively closing the valve outlet 36. In the particular preferred embodiment of effluent-operated valve illustrated in FIGS. 4A, 4B and 5, the upper portion of the valve closure guidance element 39 includes an outwardly extending flange 42 to which a ferrite magnet 40 is attached and the upper portion of the buoyant member 31 may have a steel washer 41 fastened in a cylindrical cavity 31c surrounding the valve closure guiding member 39 in such a position that it is substantially seated on the ferrite magnet 40 when the effluent-operated valve is in the closed position, as illustrated by FIG. 5. In addition, in a preferred embodiment of effluent-operated valve 30 of this invention, the valve closure guidance member 39 includes a stop nut 50 at its top, which will intercept the upward travel of the buoyant member 31 by blocking the movement of the steel washer 41 as it is carried upward by the upward movement of the valve closure assembly 30A.

As best illustrated by FIGS. 4 and 5, the buoyant element 31 comprises two buoyant elements 31a and 31b spaced apart and fastened on the elongated tube 32. The combined buoyancy of the upper and lower buoyant elements 31a and 31b provides the lifting force to overcome the weight of the valve closure assembly 30A and the downward hydrostatic forces acting on the valve closure assembly and any force of magnetic attraction present; however, as the effluent level lowers around the valve closure assembly 30A, the buoyancy of the lower buoyant element 31b acts to hold the peripheral seal-forming surface 33a of the valve closure assembly 30A above the peripheral sealable surface 38a for a larger period of time, allowing the effluent to more completely flow from the effluent collection tank 21 through the valve outlet opening 36.

In such an effluent-operated valve, the valve closure portion 33 can comprise a concave element having a peripheral seal-forming lip 33a sized to engage the peripheral sealing surface 38a of the annular flange 38, and the buoyant members 31a and 31b can comprise a polyethylene foam, or any other comparably buoyant material, in the form of an inverted cone having a maximum outer diameter of from about 7 to about 9 inches. The upper buoyant element 31a can taper from an upper diameter of about 7-9 inches and have a length of about 5-6 inches. The lower buoyant member 31b is preferably spaced about an inch or two below the upper buoyant member 31a and can have a diameter of about 4-5 inches, and a length of about one to two inches. The first container, or collection tank, 21 and the second distribution tank 23 can be molded from a thermoplastic material such as polyvinylchloride, polyethylene, polypropylene, nylon, or fiber-reinforced nylon. The first and second tanks 21 and 23 can be any size that will accommodate any number of effluent outlets 24a . . . 24x as needed for the effluent drain field. As an example, the distribution tank 23 can be 2 to 3 feet on each side; and the container, or collection tank, 21 can be 15 to 20 inches on each side, so the container, or collection tank, 21 can be carried within the distribution tank 23. The valve guidance element 39 may be nylon, or an equivalent lubricious plastic, having a sufficient length to allow the valve closure assembly 30A to travel a substantial portion of an inch or more above the peripheral sealable surface 38a.

Figure 6:
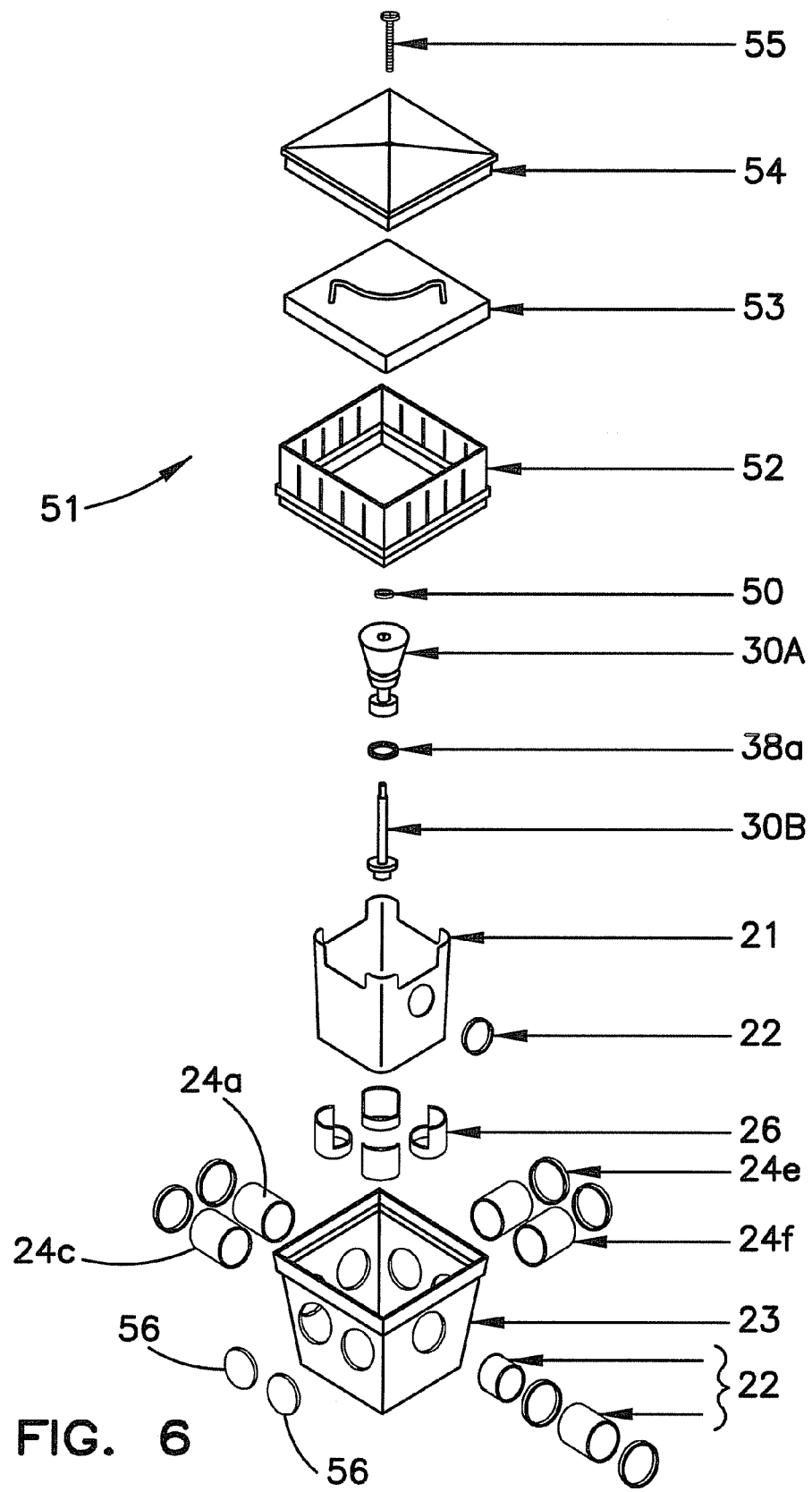
FIG. 6 is an exploded view of the preferred apparatus for uniformly distributing sewage effluent to a drain field, including a preferred effluent-operated valve, as illustrated in the prior figures.

FIG. 6 is an exploded view of a preferred apparatus of the invention with the parts of the preferred apparatus being numbered the same as FIGS. 2-5. FIG. 6 illustrates, in addition to the elements of the preferred apparatus of the invention illustrated in FIGS. 2-5, a typical means 52 for closing the top of the apparatus, including, for example, a riser 52, an insulation panel 53, a lid 54 and a screw 55 to hold the closing means 52 to the apparatus, and snap-in plugs 56 to close effluent outlets 24a and 24b, as illustrated in FIG. 6.

The drawings and the description above are directed to preferred embodiments of the invention, and those skilled in the art will recognize that other embodiments may be devised using the invention. Therefore, the foregoing description is to be regarded as illustrative rather than limiting, and it should be understood that it is the following claims including all equivalents that define the scope of the invention.

What is claimed:

1. An apparatus for uniformly distributing sewage effluent to a drain field in a septic system, comprising:
two connected tanks, the first tank having an effluent inlet communicating with a septic tank and for collecting the effluent to be distributed and carrying an effluent-operated valve therein for controlling a flow of collected effluent from within the first tank to the second tank, said second tank having a plurality of outlets communicating with said drain field and for directing effluent from its interior to a plurality of portions of a sewage drain field, wherein the first tank and effluent-operated valve are carried within and surrounded by said second tank.

2. The apparatus of claim 1, wherein the first tank and the effluent-operated valve are coaxially carried within said second tank.

3. The apparatus of claim 1, wherein said effluent-operated valve comprises a valve outlet-forming and a valve closure-guiding assembly, and an effluent-operated valve closure assembly,
said valve outlet-forming and valve closure-guiding assembly being adapted to be fastened within an opening formed in the bottom of the first tank and to support and guide the effluent-operated valve closure assembly within the first tank, said valve outlet-forming and valve closure-guiding assembly forming a peripheral sealable surface, said valve closure assembly having a peripheral seal-forming surface at its bottom adapted to engage the peripheral sealable surface of the valve outlet-forming and valve closure-guiding assembly and to close its valve outlet, and a buoyant member at its top, said valve closure assembly being carried by and in sliding engagement with the valve outlet-forming and valve closure-guiding assembly, wherein said buoyant member can move in reaction to effluent in the first tank to raise the peripheral seal-forming surface at its bottom and open the outlet formed by the valve outlet-forming and valve closure-guiding assembly, allowing effluent to flow to the second tank and simultaneously from the plurality of outlets in the second tank, and to lower the peripheral seal-forming surface at its bottom, as effluent flows from the first tank, into sealing engagement with the peripheral sealable surface of the valve outlet-forming and valve closure-guiding assembly, said valve closure assembly being guided in said movement by said valve closure-guiding assembly.

4. The apparatus of claim 3, wherein said peripheral seal-forming surface of the valve closure assembly is formed by the lower edge of a concave element.

5. The apparatus of claim 3, wherein said valve outlet-forming and valve closure-guiding assembly carries a magnet, and the valve closure assembly carries an element attracted by said magnet as the peripheral seal-forming surface of the valve closure assembly approaches the peripheral sealable surfaces of the valve outlet-forming and valve closure-guiding assembly whereby more valve closing force is generated.

6. The apparatus of claim 1, wherein the effluent operated valve comprises an upper buoyant element, and a lower buoyant element spaced below the upper buoyant element and of a size adapted to hold the effluent-operated valve open for an extended period.

7. An apparatus for distributing sewage effluent uniformly to a drain field in a septic system, comprising:
- a distribution tank with a plurality of outlets connected with a plurality of portions of the drain field;
- a collection tank within the distribution tank and having an inlet for the collection of effluent to be distributed to the drain field; and
- effluent-operated valve means within said collection tank for controlling flow of the effluent from said collection tank to said distribution tank,
- said effluent-operated valve means having a valve outlet that opens into said distribution tank, each of said plurality of effluent outlets being connected with one of the plurality of drain field portions, wherein accumulated effluent in said collection tank operates said effluent-operated valve means permitting accumulated effluent in said collection tank to flow into said distribution tank and from said distribution tank to the plurality of portions of the drain field.

8. The apparatus of claim 7, wherein said collection tank, said distribution tank and said effluent-operated valve means are substantially coaxially arranged.

9. The apparatus of claim 7, wherein said effluent-operated valve means comprises a valve outlet at the bottom of the collection tank, and a valve closure for said valve outlet connected with a buoyant element actuated by the accumulated effluent in said tank, said valve closure having a sealing portion at its bottom to engage the valve outlet and seal the valve outlet when said buoyant member is not actuated by accumulated effluent in said tank.

10. The apparatus of claim 7 wherein said effluent-operated valve means includes a buoyant element comprising an upper buoyant element, and a lower buoyant element spaced below the upper buoyant element and having sufficient buoyancy to hold the valve outlet open for an extended period as effluent flows from the collection tank.

* * * * *